(12) United States Patent
Hamilton, II et al.

(10) Patent No.: US 8,671,349 B2
(45) Date of Patent: Mar. 11, 2014

(54) VIRTUAL UNIVERSE TELEPORTATION SUGGESTION SERVICE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 12/120,968

(22) Filed: May 15, 2008

(65) Prior Publication Data

US 2009/0288002 A1   Nov. 19, 2009

(51) Int. Cl.
*G06F 3/048* (2006.01)

(52) U.S. Cl.
USPC .............................. 715/757; 715/706; 715/848

(58) Field of Classification Search
USPC .......... 715/706, 707, 715, 751, 753, 757, 848
See application file for complete search history.

(56) References Cited

U.S. PATENT DOCUMENTS

| 4,902,469 | A | 2/1990 | Watson et al. |
|---|---|---|---|
| 5,371,851 | A | 12/1994 | Pieper et al. |
| 5,537,618 | A | 7/1996 | Boulton et al. |
| 5,736,982 | A | 4/1998 | Suzuki et al. |
| 5,898,423 | A | 4/1999 | Tognazzini et al. |
| 5,966,129 | A | 10/1999 | Matsukuma et al. |
| 5,969,720 | A | 10/1999 | Lisle et al. |
| 5,982,372 | A | 11/1999 | Brush, II et al. |
| 5,983,003 | A | 11/1999 | Lection et al. |
| 6,023,270 | A | 2/2000 | Brush, II et al. |
| 6,023,698 | A | 2/2000 | Lavey, Jr. et al. |
| 6,064,389 | A | 5/2000 | Berry et al. |
| 6,137,904 | A | 10/2000 | Lubin et al. |
| 6,219,045 | B1 | 4/2001 | Leahy et al. |
| 6,226,009 | B1 | 5/2001 | Carraro et al. |
| 6,298,374 | B1 | 10/2001 | Sasaki et al. |
| 6,329,986 | B1 | 12/2001 | Cheng |
| 6,346,938 | B1 | 2/2002 | Chan et al. |
| 6,346,956 | B2 | 2/2002 | Matsuda |
| 6,388,688 | B1 | 5/2002 | Schileru-key |
| 6,437,777 | B1 | 8/2002 | Kamachi et al. |
| 6,496,851 | B1 | 12/2002 | Morris et al. |
| 6,570,587 | B1 | 5/2003 | Efrat et al. |
| 6,580,441 | B2 | 6/2003 | Schileru-key |
| 6,636,889 | B1 | 10/2003 | Estrada et al. |
| 6,674,484 | B1 | 1/2004 | Boland et al. |
| 6,732,146 | B1 | 5/2004 | Miyake |
| 6,753,857 | B1 | 6/2004 | Matsuura et al. |

(Continued)

OTHER PUBLICATIONS

U.S. Appl. No. 11/839,868, Office Action dated Apr. 30, 2010.

(Continued)

*Primary Examiner* — Tadeese Hailu
(74) *Attorney, Agent, or Firm* — Lisa Ulrich; Hoffman Warnick LLC

(57) ABSTRACT

The present invention is directed to a system, method and program product for providing teleportation suggestions to avatars in a virtual universe. A service is provided that determines the set of teleportation suggestions for the avatar based on at least one of: an inventory analysis of the avatar, a historical teleportation analysis of the avatar, a motion analysis of the avatar, a social network analysis of the avatar, or a ratings analysis of locations within the virtual universe.

22 Claims, 3 Drawing Sheets

(56) References Cited

U.S. PATENT DOCUMENTS

| | | | |
|---|---|---|---|
| 6,772,195 B1 | 8/2004 | Hatlelid et al. | |
| 6,784,901 B1 | 8/2004 | Harvey et al. | |
| 6,981,223 B2 | 12/2005 | Becker et al. | |
| 6,982,372 B2 | 1/2006 | England | |
| 6,990,381 B2 | 1/2006 | Nomura et al. | |
| 7,146,627 B1 | 12/2006 | Ismail et al. | |
| 7,155,680 B2 * | 12/2006 | Akazawa et al. | 715/757 |
| 7,181,690 B1 | 2/2007 | Leahy et al. | |
| 7,269,632 B2 | 9/2007 | Edeker et al. | |
| 7,293,235 B1 | 11/2007 | Powers et al. | |
| 7,515,156 B2 | 4/2009 | Tinker et al. | |
| 7,643,673 B2 | 1/2010 | Rohlf et al. | |
| 7,827,208 B2 * | 11/2010 | Bosworth et al. | 707/802 |
| 2001/0055039 A1 | 12/2001 | Matsuda | |
| 2002/0026477 A1 | 2/2002 | Choi | |
| 2002/0041327 A1 | 4/2002 | Hildreth et al. | |
| 2002/0112002 A1 | 8/2002 | Abato | |
| 2002/0130904 A1 | 9/2002 | Becker et al. | |
| 2002/0138607 A1 * | 9/2002 | O'Rourke et al. | 709/224 |
| 2002/0152147 A1 | 10/2002 | Shulman et al. | |
| 2002/0158873 A1 | 10/2002 | Williamson | |
| 2002/0188678 A1 * | 12/2002 | Edecker et al. | 709/204 |
| 2003/0040946 A1 | 2/2003 | Sprenger et al. | |
| 2003/0067554 A1 | 4/2003 | Klarfeld et al. | |
| 2003/0122858 A1 | 7/2003 | Mauve | |
| 2003/0126318 A1 | 7/2003 | Nomura et al. | |
| 2003/0172174 A1 | 9/2003 | Mihalcheon | |
| 2003/0187984 A1 | 10/2003 | Banavar et al. | |
| 2003/0212760 A1 | 11/2003 | Chen et al. | |
| 2004/0002380 A1 | 1/2004 | Brosnan et al. | |
| 2004/0034831 A1 | 2/2004 | Grober et al. | |
| 2004/0130549 A1 | 7/2004 | Tinker et al. | |
| 2004/0252123 A1 | 12/2004 | Estrada et al. | |
| 2005/0022139 A1 | 1/2005 | Gettman et al. | |
| 2005/0216346 A1 * | 9/2005 | Kusumoto et al. | 705/14 |
| 2005/0278323 A1 | 12/2005 | Horvitz et al. | |
| 2006/0010229 A1 | 1/2006 | Chen et al. | |
| 2006/0080613 A1 * | 4/2006 | Savant | 715/745 |
| 2006/0119598 A1 | 6/2006 | Littlefield | |
| 2006/0212900 A1 | 9/2006 | Ismail et al. | |
| 2006/0284792 A1 | 12/2006 | Foxlin | |
| 2007/0035548 A1 * | 2/2007 | Jung et al. | 345/474 |
| 2007/0050716 A1 | 3/2007 | Leahy et al. | |
| 2007/0050721 A1 | 3/2007 | de Souza | |
| 2007/0240119 A1 * | 10/2007 | Ducheneaut et al. | 717/124 |
| 2008/0086696 A1 * | 4/2008 | Sri Prakash et al. | 715/757 |
| 2008/0134056 A1 * | 6/2008 | Shuster | 715/757 |
| 2008/0291217 A1 | 11/2008 | Vincent et al. | |
| 2009/0013052 A1 | 1/2009 | Robarts et al. | |
| 2009/0046094 A1 | 2/2009 | Hamilton, II et al. | |
| 2009/0064052 A1 | 3/2009 | Mihalcheon | |
| 2009/0094535 A1 * | 4/2009 | Bromenshenkel et al. | 715/757 |
| 2009/0165140 A1 | 6/2009 | Robinson et al. | |
| 2009/0267938 A1 * | 10/2009 | Nicol et al. | 345/419 |
| 2009/0276718 A1 * | 11/2009 | Dawson et al. | 715/753 |
| 2010/0011312 A1 | 1/2010 | Banerjee et al. | |
| 2011/0279461 A1 | 11/2011 | Hamilton, II et al. | |

OTHER PUBLICATIONS

Brown, Stuart, "Google Browser—The Future of the Internet?", FirstScience.com, http://www.firstscience.co.uk/Site/editor/077_ramblings_05112004.asp, Nov. 5, 2004.

Anonymous, "Window (computing)", Wikipedia, https://en.wikipedia.org/wiki/Window_(computing), Jun. 3, 2007.

U.S. Appl. No. 11/839,868, Final Office Action dated Jul. 8, 2010.

U.S. Appl. No. 11/839,884, Office Action dated Sep. 30, 2010.

U.S. Appl. No. 11/839,868, Office Action dated Mar. 18, 2011.

U.S. Appl. No. 11/839,884, Notice of Allowance and Fees Due dated Mar. 28, 2011.

U.S. Appl. No. 13/154,043, Office Action dated Nov. 4, 2011.

U.S. Appl. No. 13/154,043, Notice of Allowance dated Aug. 8, 2012.

U.S. Appl. No. 13/154,043, Office Action dated Jun. 1, 2012.

U.S. Appl. No. 11/839,898, Notice of Allowance and Fees Due dated Aug. 17, 2012.

Snavely et al., "Photo Tourism: Exploring Photo Collections in 3D", ACM, 2006.

U.S. Appl. No. 11/839,898, Office Action dated Mar. 22, 2011.

Grammenos et al., "Virtual Prints: Leaving trails in Virtual Environments", Eighth Eurographics Workshop on Virtual Environments, 2002.

U.S. Appl. No. 11/839,898, Office Action dated Oct. 1, 2010.

U.S. Appl. No. 11/839,898, Office Action dated Dec. 23, 2011.

Elvins et al., "Worldlets: 3D Thumbnails for 3D Browsing".

Elvins et al., "Worldlets—3D Thumbnails for Wayfinding in Virtual Environments", ACM, 1997.

Chittaro et al, "Dynamic Generation of Personalized VRML Content: a General Approach and its Applicationt o 3D E-Commerce", ACM, 2002.

Newitz, "Your Second Life is Ready", Popular Science Magazine, popsci.com, 2006.

Tveit, Amund, "Customizing Cyberspace: Methods for User Representation and Prediction", Department of Computer and Information Science, Norwegian University of Science and Technology, N-7491 Trondheim, Norway.

Judson et al., "Virtual Venue Management Users Manual: Access Grid Toolkit Documentation, Version 2.3", Argonne National Laboratory, Argonne, IL, Feb. 2006.

Book, Betsy, "Moving Beyond the Game: Social Virtual Worlds", State of Play 2 Conference, Oct. 2004.

Huang, Mian, "Sharing Interactive 3D Scenes in a Distributed Collaborative Environment", Rensselaer Polytechnic Institute, Jul. 2003.

Anonymous, "DesktopX: The User Guide: vol. 2".

Celentano et al., "Adaptive Interaction in Web3D Virtual Worlds", ACM 2004.

Wang et al., "SmartCU3D: a Collaborative Virtual Environment System with Behavior Based Interaction Management", ACM, 2001.

* cited by examiner

VIRTUAL UNIVERSE TELEPORTATION SUGGESTION SERVICE

CROSS-REFERENCE TO RELATED APPLICATIONS

The present invention is related to co-pending U.S. patent application Ser. No. 11/839,898, filed on Aug. 16, 2007, entitled METHOD AND APPARATUS FOR PREDICTING AVATAR MOVEMENT IN A VIRTUAL UNIVERSE, the contents of which is hereby incorporated.

FIELD OF THE INVENTION

The present invention relates to virtual environments, and more specifically relates to a system, method and program product for suggesting teleportation locations in a virtual universe.

BACKGROUND OF THE INVENTION

A virtual universe is an interactive simulated environment accessed by multiple users through an online interface. Users inhabit and interact in the virtual universe via avatars, which are two or three-dimensional graphical representations of humanoids. There are many different types of virtual universes, however there are several features many virtual universes generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual universes, such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual universes present a tremendous new outlet for both structured and unstructured virtual collaboration, gaming and exploration, as well as real-life simulations in virtual spaces. These activities, along with yet to be disclosed new dimensions, in turn provide a wide open arena for creative and new interactions in simulated environments.

Frequently, user controlled avatars in a virtual universe wish to move around to different locations to participate in different experiences. Movement about the virtual universe can be accomplished with techniques such as teleportation, which allows the avatar to instantly move from one area to another. Often, however, the avatar is unsure where to go to find areas that are of interest. Avatars typically rely on past experiences, word of mouth, published lists, roaming, etc., to find new locations. Unfortunately, these techniques lack the efficacy to ensure the avatar is getting exposed to the best experiences. In view of the foregoing, there exists a need for an approach that addresses at least one of the deficiencies of the related art.

SUMMARY OF THE INVENTION

A first aspect of the present invention is directed to a system for suggesting teleportation locations within a virtual universe, comprising: a suggestion generation service that determines a set of teleportation suggestions for an avatar based on at least one of: an inventory analysis of the avatar, a historical teleportation analysis of the avatar, a motion analysis of the avatar, a social network analysis of the avatar, or a ratings analysis of locations within the virtual universe; a triggering system for launching the suggestion generation service; and a system for outputting the set of teleportation suggestions.

A second aspect of the present invention is directed to a method of suggesting teleportation locations within a virtual universe, comprising: sensing an event indicating that an avatar is to be provided with a set of teleportation suggestions; determining the set of teleportation suggestions for the avatar based on at least one of: an inventory analysis of the avatar, a historical teleportation analysis of the avatar, a motion analysis of the avatar, a social network analysis of the avatar, or a ratings analysis of locations within the virtual universe; and outputting the set of teleportation suggestions.

A third aspect of the present invention is directed to a program product stored on a computer readable medium for suggesting teleportation locations within a virtual universe, which when executed by a computer system, comprises: program code for sensing an event indicating that an avatar is to be provided with a set of teleportation suggestions; program code for determining the set of teleportation suggestions for the avatar based on at least one of: an inventory analysis of the avatar, a historical teleportation analysis of the avatar, a motion analysis of the avatar, a social network analysis of the avatar, or a ratings analysis of locations within the virtual universe; and program code for outputting the set of teleportation suggestions.

A fourth aspect of the present invention is directed to a method for deploying an application for suggesting teleportation locations within a virtual universe, comprising: providing a computer infrastructure being operable to: sense an event indicating that an avatar is to be provided with a set of teleportation suggestions; determine the set of teleportation suggestions for the avatar based on at least one of: an inventory analysis of the avatar, a historical teleportation analysis of the avatar, a motion analysis of the avatar, a social network analysis of the avatar, or a ratings analysis of locations within the virtual universe; and output the set of teleportation suggestions.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
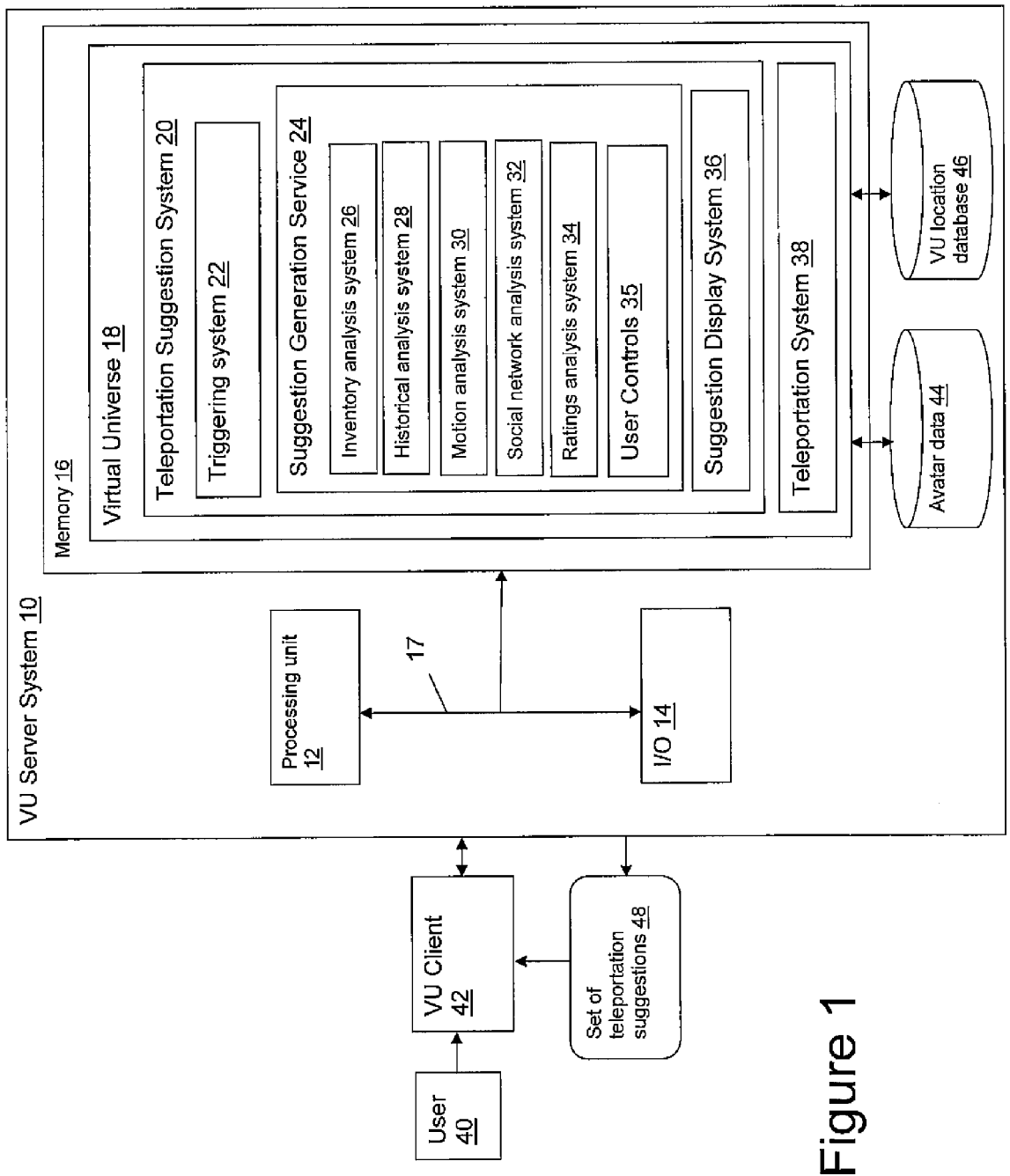
FIG. 1 depicts a virtual universe infrastructure in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the drawings, FIG. 1 depicts a virtual universe infrastructure that includes a virtual universe (VU) server system 10 for implementing and serving a virtual universe 18 over a network, and a virtual universe (VU) client 42 that provides access to the virtual universe 18 for user 40. In general, user 40 accesses virtual universe 18 from a remote computer running the VU clients 42. The remote computer may comprise any type of computing device, e.g., a personal computer, a laptop, a handheld device, etc. Within virtual universe 18, user 40 is represented as an avatar, which can be navigated around the virtual universe 18 by the user 40.

Within virtual universe 18 is a teleportation suggestion system 20 that can suggest teleportation locations to the avatar controlled by user 40. Teleportation system 38 is provided to cause the actual teleportation of the avatar from a first location in the virtual universe 18 to a second location in the virtual universe 18. Teleportation suggestion system 20 generally includes: (1) a triggering system 22 that launches a suggestion generation service 24 based on some triggering event; (2) the suggestion generation service 24 itself, which analyzes one or more criteria to calculate a set of teleportation suggestions 48 to be provided to the avatar; and (3) a suggestion display system 36 for displaying/outputting the set of teleportation suggestions 48. The teleportation suggestion system 20 may be run and implemented by the VU 18 itself, by a third-party service, or a combination of both. Accordingly, although shown as a single system in FIG. 1, it is understood that some or all of the functions and systems described herein may be distributed among two or more systems.

Triggering system 22 may utilize any type of triggering event to launch the suggestion generation service 24. Examples include: (1) having the avatar visit a land location and interacting with an automated avatar; (2) using an object representing the suggestion generation service 24 from the avatar's inventory; (3) accessing the suggestion generation service 24 via a menu in the VU client 42 and selecting a proposed teleport location externally from the VU client 42 which starts the VU client 42 and teleports the avatar to the location; (4) automatically detecting that the avatar is "bored" (boredom may for instance be inferred by the user typing "I am bored," the avatar remaining idle for a period of time, or the user wandering around, as if stuck in a region, in an apparently aimless manner; etc.).

Suggestion generation service 24 may utilize one or more analysis systems to provide a set of teleportation suggestions 48, including: an inventory analysis system 26, a historical analysis system 28, a motion analysis system 30, a social network analysis system 32 and a ratings analysis system 34.

Inventory analysis system 26 allows suggestion generation service 24 to generate a set of teleportation suggestions 48 based on a scan of the avatar's inventory. This may be accomplished by providing: (a) a database of avatar data 44 in which inventory information is stored for each avatar; and (b) a VU location database 46 that contains metadata associated with locations in the VU 18. Metadata may comprise any type of information that describes a location. For instance, a night club location may be associated with the metadata tags "music," "dancing," "social," "singles," "adults only," "alcohol," etc. Then, in one illustrative embodiment, inventory analysis system 26 may:

(1) determine at least one "context" from each inventory item;

(2) match each context against metadata associated with virtual universe locations;

(3) score the resulting matches; and (4) rank the resulting set of locations based on the scoring.

For instance, if the avatar had a camera and some photographs in its inventory, inventory analysis system 26 may determine the context "photography" from both items. It would then search the VU location database 46 to find VU locations that have "photography" in their metadata.

Historical analysis system 28 allows suggestion generation service 24 to generate a set of teleportation suggestions 48 based on a scan of the avatar's previous teleportation activities. This may be accomplished by providing: (a) a database of avatar data 44 in which past teleportation information is stored for each avatar; and (b) a VU location database 46 that contains a set of locations and associated metadata. Then, in one illustrative embodiment, historical analysis system 28 may:

(1) determine at least one "context" from each past teleportation;

(2) match each context against metadata associated with virtual universe locations;

(3) score the resulting matches; and (4) rank the resulting set of locations based on the scoring.

For instance, historical analysis system 28 may determine that the avatar has recently teleported to various parks containing water fountains or water falls. The contexts "park" and "water" may then be used to search the VU location database 46 for locations that have the words "park" and "water" in their metadata descriptions.

Motion analysis system 30 allows suggestion generation service 24 to generate a set of teleportation suggestions 48 based on a history of the avatar's motions. Illustrative motions may for instance include significant jitter, back and forth movements, klutziness, etc. This may be accomplished by providing: (a) a database of avatar data 44 in which past motion information is stored for each avatar; and (b) a VU location database 46 that contains a set of locations and associated metadata. Then, in one illustrative embodiment, motion analysis system 30 may:

(1) determine at least one "context" from past motions;

(2) match each context against metadata associated with virtual universe locations;

(3) score the resulting matches; and (4) rank the resulting set of locations based on the scoring.

For instance, motion analysis system 30 may determined that the avatar is a "newcomer" because of klutzy motions, such as falling off paths, tripping, dropping objects, etc., or because of a lack of teleportation or other activity in the past. The context "newcomer" can then be used to search for locations that have simple terrain structures, simple user interfaces, learning environments, etc.

Social network analysis system 32 allows suggestion generation service 24 to generate a set of teleportation suggestions 48 based on a history of the avatar's interactions, i.e., their social network. Illustrative interactions may for instance include clubs or associations to which the avatar belongs, buddy lists, the identify of other avatars with whom the avatar has engaged in chat sessions, avatars that were avoided or whose interaction resulted in a negative outcome, etc. A negative outcome may be determined through means such as loss of property without an authorized transaction, negative rating given to an avatar, a fight, etc. This may be accomplished by providing a database of avatar data 44 in which past interaction, inventory information and teleportation information is stored for each avatar. In one illustrative embodiment, social network analysis system 32 may:

(1) identify other avatars within the requesting avatar's social network;

(2) determine which avatars most closely match the requesting avatar, e.g., by examining the inventory and past teleportation history of each, etc;

(3) analyze the teleportation activities of the closest matching avatars and identify locations that the requesting avatar has not visited; and (4) rank the resulting set of locations.

For instance, social network analysis system 32 may identify every avatar that the requesting avatar communicated with for more than 5 minutes over the past 30 days. Then, the inventory of each such avatar would be analyzed to find the closest matching set of avatars. A teleportation history of the closest matching set of avatars could then be used to determine the set of teleportation suggestions 48.

Ratings analysis system 32 allows suggestion generation service 24 to generate a set of teleportation suggestions 48 based on location ratings. In this case, the suggestion generation service 24 requests from another service or set of services a list of currently popular locations within the VU. Popularity can be calculated by resident population, density, resident rating or any other means.

It is understood that suggestion generation system 24 may employ any one or more of the analysis systems 26, 28, 30, 32, 34. In the case where two or more analysis systems are used, the results from each can be combined and/or ranked in any manner. Regardless of which is used, user controls 35 may be implemented to further refine the teleportation suggestions 48 in any manner. For example, user controls 35 may: allow the user 40 to request that the teleportation suggestions 48 do not include any previously visited locations; allow the user 40 to set parental controls that filter unwanted locations; allow the user 40 to limit the suggestions 48 to a category; etc.

Once the set of teleportation suggestions 48 are determined, suggestion display system 36 displays the suggestions back to the user 40 via VU client 42. The suggestion display system 36 may be implemented in any fashion to output the information to the user 40. Once displayed, the user can select a location for teleportation, which will instantly move the avatar to the selected location within the VU 18. The suggestion display system 36 may be implemented to, e.g., send a list of teleport locations, send teleport invitations, actually teleport the user 40 without sending an invitation or list, etc.

Figure 2:
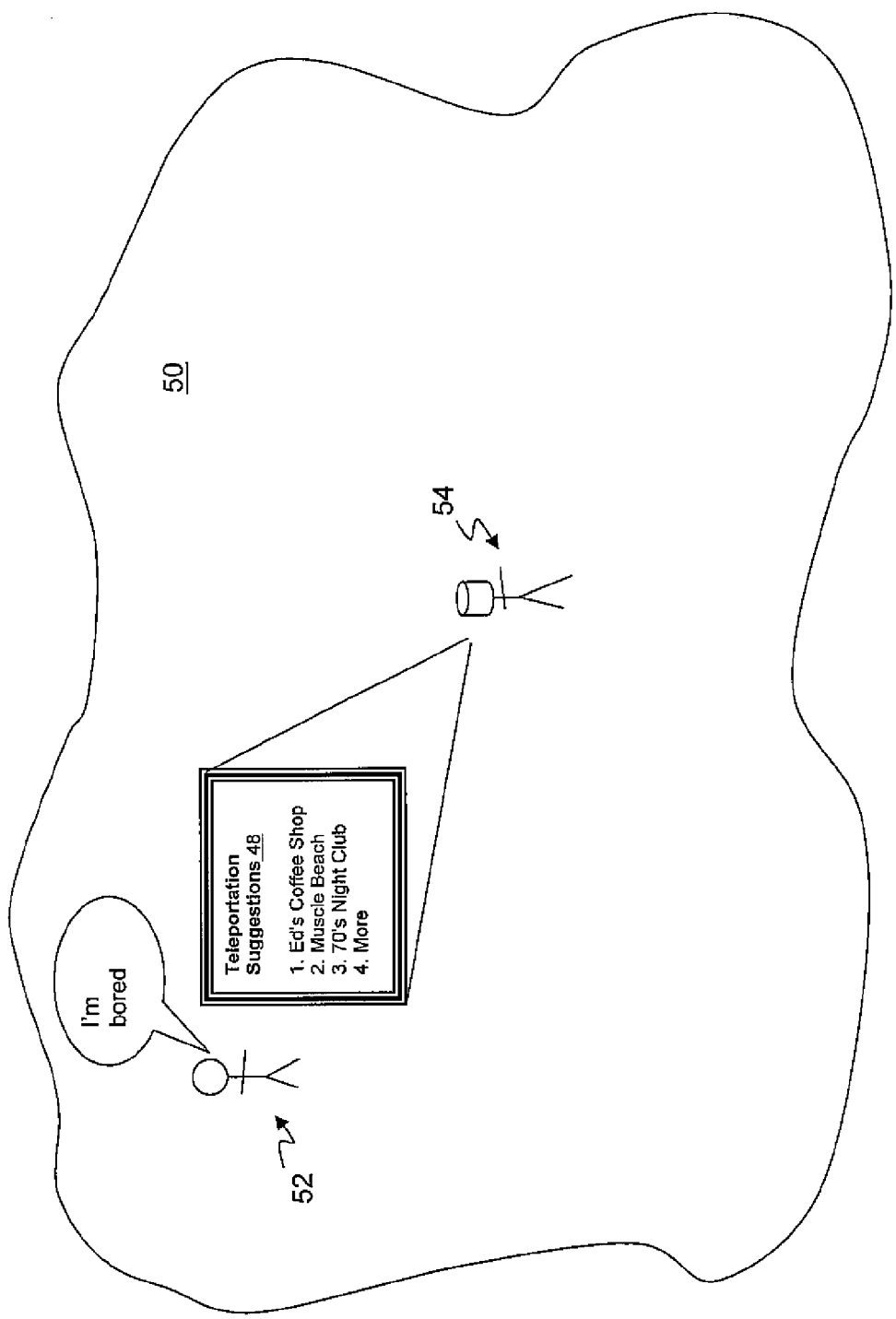
FIG. 2 depicts an illustrative implementation of a suggestion generation service within a virtual universe in accordance with the present invention.

Referring to FIG. 2, an illustrative example of an implementation of teleportation suggestion system 20 is provided. In the example, avatar 52 has navigated to a region 50 within a virtual universe. Within region 50, avatar 52 has approached a virtual universe robot (i.e., an automated avatar) and announced "I'm bored." This event triggers the suggestion generation service 24 described in FIG. 1, and causes the set of teleportation suggestions 48 to be displayed. The avatar 52 can then select one of the suggestions, and be transported to the selected location.

Note that this is but one of an unlimited number of possible implementations. In other cases, the teleportation suggestion system 20 could be implemented to suggest likely places at which a user 40 may purchase items (virtual or physical). For example, if an avatar has numerous e-books in their inventory, an offer for teleport to a virtual book store may be presented to the user 40. In a more complex embodiment, the teleportation suggestion system 20 could detect versions of items within an avatar's inventory. If items, e.g., executable software, had newer versions available within the VU, a teleport may be proposed to a region containing a new version of the item for sale. For instance, if the user 40 had an older version of an accounting package in their inventory, they may be proposed a teleport to a region that is selling a new version of the package. Other implementations may be more social in nature, e.g., teleportation suggestion system 20 could detect that the user's 40 marital status is single, e.g., based on a user defined profile or inventory items, and propose teleportation to regions of the VU that are designed for singles.

Fees may be collected and/or determined in any manner in connection with teleportation suggestion system, e.g., costs could be assessed to the user based on the number of teleports invoked in response to such suggestions, costs could be assessed to owners of locations to which a user teleports, etc.

Figure 3:
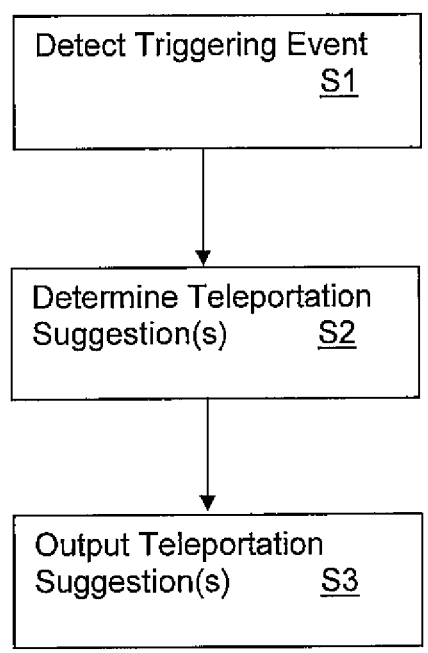
FIG. 3 depicts a flow diagram showing a method of a suggestion generation service within a virtual universe in accordance with the present invention.

FIG. 3 depicts a flow diagram showing a method of the invention. At step S1, a triggering event is detected. At step S2, one or more teleportation suggestions are determined. At step S3, the teleportation suggestion or suggestions are outputted.

Referring again to FIG. 1, VU server system 10 is shown as including a processing unit 12, a memory 16, at least one input/output (I/O) interface 14, and a bus 17. Further, the VU server system 10 may also include other facilities such as external devices and storage systems. In general, the processing unit 12 executes computer program code, such as virtual universe 18, that is stored in memory 16. While executing computer program code, the processing unit 12 can read and/or write data from/to the memory 16, a storage system, and/or I/O interface(s) 14. Bus 17 provides a communication link between each of the components in the computer system 10. External device(s) can comprise any device (e.g., display) that enables a user 40 to interact with the VU server system 10 or any device that enables the VU server system 10 to communicate with one or more other computer systems. Client computers running a VU client 42 may include similar features.

Both the client computers and VU server system 10 can comprise any general purpose computing article of manufacture capable of executing computer program code installed thereon (e.g., a personal computer, server, handheld device, etc.). However, it is understood that the VU server system 10 is only representative of various possible computer systems that may perform the various processes of the invention. To this extent, in other embodiments, the client computers and VU server system 10 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the virtual world infrastructure shown in FIG. 1 is only illustrative of various types of platforms that can be used to implement the present invention. For example, in an embodiment, the VU server system 10 can comprise two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that the various systems can be implemented independently, combined, and/or stored in memory for one or more separate computer systems that communicate over a network. Further, it is understood that some of the systems and/or functionality may not be implemented, or additional systems and/or functionality may be included as part of the invention.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 36 and/or a storage system (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a VU server system 10 that performs the processes of the invention for one or more customers. In return, the service provider can receive payment from the customer(s) under a subscription and/or fee agreement and/or the service provider can receive payment from the sale of advertising space to one or more third parties.

In still another embodiment, a virtual universe 18 can be obtained (e.g., created, maintained, having made available to, etc.) and one or more systems for performing the processes of the invention can be obtained (e.g., created, purchased, used, modified, etc.) and deployed. To this extent, the deployment of each system can comprise one or more of (1) installing program code on a client computer, from a computer-readable medium; (2) adding one or more computer systems to the computer infrastructure; and (3) incorporating and/or modifying one or more existing systems of a computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and clearly, many modifications and variations are possible.

What is claimed is:

1. A computer-implemented system including a computing device configured to suggest teleportation locations within a virtual universe, comprising:
   a suggestion generation service that determines a set of teleportation suggestions for a requesting avatar based on a social network analysis of the avatar that identifies each avatar with whom the requesting avatar has communicated for more than a first predefined period within a second predefined period, determines which of the identified avatars most closely match the requesting avatar responsive to an analysis of at least an inventory of each identified avatar, analyzes previous teleportation activities of the avatars that match the requesting avatar most closely, and selects sites to which the requesting avatar has not traveled as the set of teleportation suggestions;
   a triggering system for launching the suggestion generation service; and
   a system for outputting the set of teleportation suggestions.

2. The system of claim 1, wherein the teleportation suggestions are determined based at least in part on an inventory analysis of the avatar that determines a context of at least one item in an inventory of the avatar, and matches the context to metadata associated with locations in the virtual universe.

3. The system of claim 1, wherein the teleportation suggestions are determined based at least in part on a historical teleportation analysis of the avatar that determines a context of at least one previous teleportation of the avatar, and matches the context to metadata associated with locations in the virtual universe.

4. The system of claim 1, wherein the teleportation suggestions are determined based at least in part on a motion analysis of the avatar that determines a context of at least one previous motion of the avatar, and matches the context to metadata associated with locations in the virtual universe.

5. The system of claim 1, wherein the first predefined period is less than sixty minutes.

6. The system of claim 1, wherein the teleportation suggestions are determined based at least in part on a ratings analysis system that analyzes ratings associated with locations in the virtual universe.

7. The system of claim 1, further comprising user controls for filtering the set of teleportation suggestions provided by the suggestion generation service.

8. A method of suggesting teleportation locations within a virtual universe, comprising:
   sensing an event indicating that an avatar is to be provided with a set of teleportation suggestions;
   determining the set of teleportation suggestions for the avatar based on a social network analysis of the avatar that identifies each avatar with whom the requesting avatar has communicated for more than a first predefined period within a second predefined period, determines which of the identified avatars most closely match the requesting avatar responsive to an analysis of at least an inventory of each identified avatar, analyzes previous teleportation activities of the ether most closely matched avatars, and selects sites to which the requesting avatar has not been as the set of teleportation suggestions; and
   outputting the set of teleportation suggestions.

9. The method of claim 8, wherein the determining of the set of teleportation suggestions includes performing an inventory analysis of the avatar that determines a context of at least one item in an inventory of the avatar, and matches the context to metadata associated with locations in the virtual universe.

10. The method of claim 8, wherein the determining of the set of teleportation suggestions includes performing a historical teleportation analysis of the avatar that determines a context of at least one previous teleportation of the avatar, and matches the context to metadata associated with locations in the virtual universe.

11. The method of claim 8, wherein the determining of the set of teleportation suggestions includes performing a motion analysis of the avatar that determines a context of at least one previous motion of the avatar, and matches the context to metadata associated with locations in the virtual universe.

12. The method of claim 8, wherein the first predefined period is less than sixty minutes.

13. The method of claim 8, wherein a ratings analysis system analyzes ratings associated with locations in the virtual universe.

14. The method of claim 8, further comprising user controls for filtering the set of teleportation suggestions provided by the suggestion generation service.

15. A program product stored on a computer readable storage device for suggesting teleportation locations within a virtual universe, which when executed by a computer system, comprises:
    program code for sensing an event indicating that an avatar is to be provided with a set of teleportation suggestions;
    program code for determining the set of teleportation suggestions for the avatar based on a social network analysis of the avatar that identifies each avatar with whom the requesting avatar has communicated for more than a first predefined period within a second predefined period, determines which of the identified avatars most closely match the requesting avatar responsive to an analysis of an inventory of each identified avatar, analyzes previous teleportation activities of the avatars that match the requesting avatar most closely, and selects sites to which the requesting avatar has not been as the set of teleportation suggestions; and
    program code for outputting the set of teleportation suggestions.

16. The program product of claim 15, wherein the program code for determining the set of teleportation suggestions further performs an inventory analysis of the avatar that determines a context of at least one item in an inventory of the avatar, and matches the context to metadata associated with locations in the virtual universe.

17. The program product of claim 15, wherein the program code for determining the set of teleportation suggestions further performs a historical teleportation analysis of the avatar that determines a context of at least one previous teleportation of the avatar, and matches the context to metadata associated with locations in the virtual universe.

18. The program product of claim 15, wherein the program code for determining the set of teleportation suggestions further performs a motion analysis of the avatar that determines a context of at least one previous motion of the avatar, and matches the context to metadata associated with locations in the virtual universe.

19. The program product of claim 15, wherein the second predefined period is at least one day.

20. The program product of claim 15, wherein a ratings analysis system analyzes ratings associated with locations in the virtual universe.

21. The program product of claim 15, further comprising user controls for filtering the set of teleportation suggestions provided by the suggestion generation service.

22. A method for deploying an application for suggesting teleportation locations within a virtual universe, comprising:
    providing a computer infrastructure being operable to:
        sense an event indicating that an avatar is to be provided with a set of teleportation suggestions;
        determine the set of teleportation suggestions for the avatar based on a social network analysis of the avatar that identifies each avatar with whom the requesting avatar has communicated for more than a first predefined period within a second predefined period, determines which of the identified avatars most closely match the requesting avatar, and analyzes previous teleportation activities of the avatars that match the requesting avatar most closely, and selects sites to which the requesting avatar has not been as the set of teleportation suggestions; and
        output the set of teleportation suggestions.

* * * * *